(12) United States Patent
Gill

(10) Patent No.: US 6,275,363 B1
(45) Date of Patent: Aug. 14, 2001

(54) READ HEAD WITH DUAL TUNNEL JUNCTION SENSOR

(75) Inventor: Hardayal Singh Gill, Portala Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/359,997

(22) Filed: Jul. 23, 1999

(51) Int. Cl.[7] ................................ G11B 5/127; G11B 5/33
(52) U.S. Cl. ............................................. 360/324.2
(58) Field of Search .......................... 360/324.2, 121, 360/317, 313, 324.11, 314, 213 FOR

(56) References Cited

U.S. PATENT DOCUMENTS

| | | | |
|---|---|---|---|
| 5,636,093 | * 6/1997 | Gijs et al. | 360/126 |
| 5,650,958 | * 7/1997 | Gallagher et al. | 364/173 |
| 5,764,567 | * 6/1998 | Parkin | 365/173 |
| 5,768,069 | * 6/1998 | Mauri | 360/314 |
| 5,966,012 | * 10/1999 | Parkin | 324/252 |
| 6,124,711 | * 9/2000 | Tanaka et al. | 324/252 |

* cited by examiner

Primary Examiner—Robert S. Tupper
Assistant Examiner—Julie Anne Watko
(74) Attorney, Agent, or Firm—Gray Cary Ware & Freidenrich; Ervin F. Johnston

(57) ABSTRACT

A dual tunnel junction sensor is provided which has an antiparallel (AP) coupled free layer structure which optimizes in-phase scattering of conduction electrons and response to signal fields. The sensor has a total number of ferromagnetic layers which assures that magnetic moments between the AP coupled free layer structure and pinned layer structures on each side of the free layer structure are in phase for adding the resistance changes on each side of the free layer structure due to the in-phase scattering of conduction electrons.

57 Claims, 9 Drawing Sheets

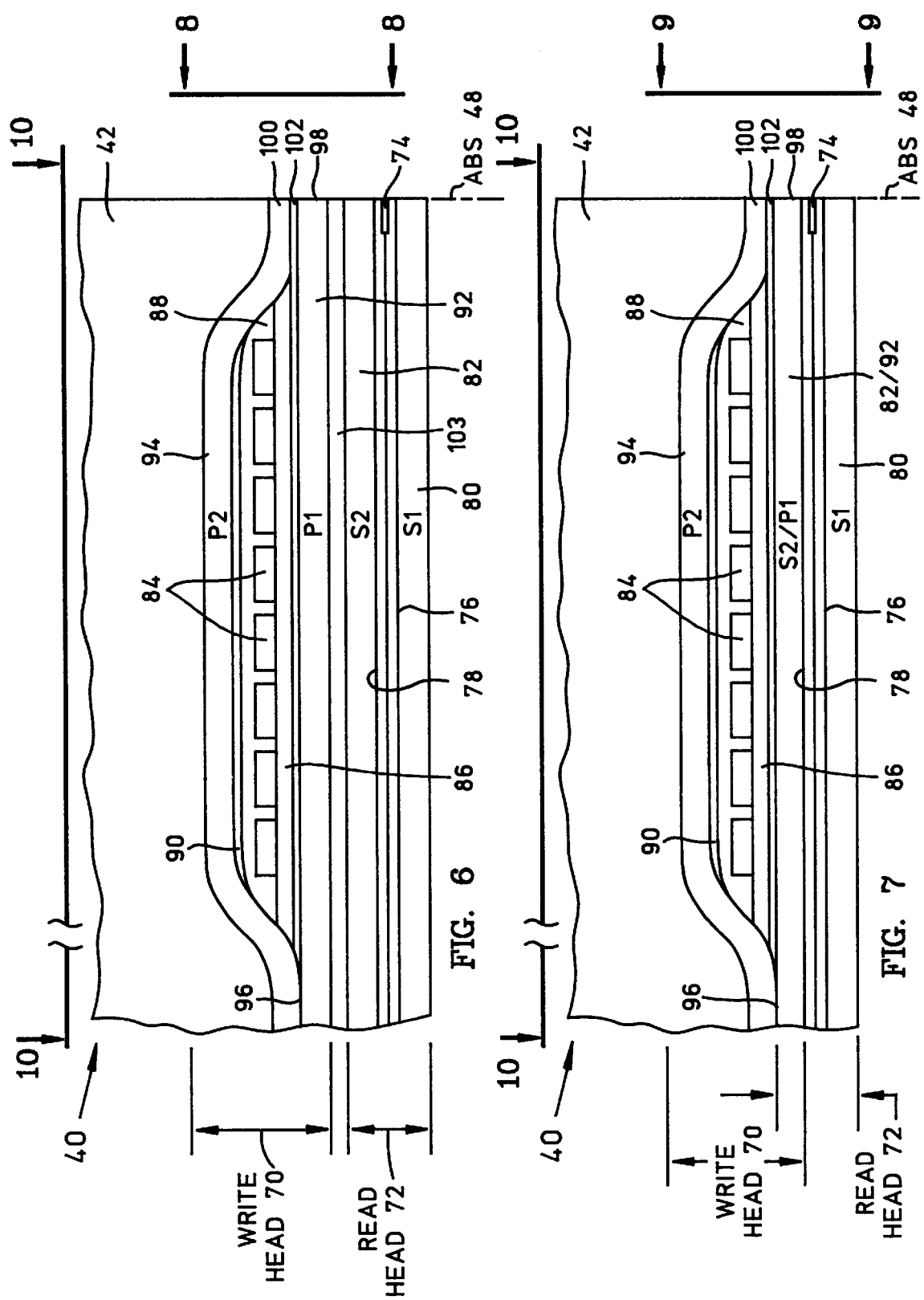

READ HEAD WITH DUAL TUNNEL JUNCTION SENSOR

BACKGROUND OF THE INVENTION

1. Field of the Invention

The present invention relates to a read head with a dual tunnel junction sensor and more particularly to a dual tunnel junction sensor that produces a double tunnel junction effect and has a ferromagnetic free layer structure that has improved linear bit density.

2. Description of the Related Art

The heart of a computer is an assembly that is referred to as a magnetic disk drive. The magnetic disk drive includes a rotatable magnetic disk, write and read heads that are suspended by a suspension arm above the disk and an actuator that swings the suspension arm to place the read and write heads over selected circular tracks on the rotating disk. The read and write heads are mounted on a slider that has an air bearing surface (ABS). The suspension arm biases the slider into contact with the surface of the disk when the disk is not rotating but, when the disk rotates, air is swirled by the rotating disk adjacent the ABS to cause the slider and the write and read heads to ride on an air bearing a slight distance from the surface of the rotating disk. During rotation of the disk the write head writes magnetic bits of information (signal fields) to the disk and the read senses the magnetic bits (signal fields) from the disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A magnetic gap is formed between the first and second pole piece layers by a write gap layer at an air bearing surface (ABS) of the write head. The pole piece layers are connected at a back gap. Current conducted to the coil layer induces a magnetic field across the gap between the pole pieces. This field fringes across the gap at the ABS for the purpose of writing the aforementioned magnetic bits in circular tracks on the rotating disk.

A typical sensor employed by recent read heads for sensing signal fields from the rotating magnetic disk is a spin valve sensor. The spin valve sensor includes a nonmagnetic spacer layer sandwiched between a ferromagnetic pinned layer and a ferromagnetic free layer. First and second leads are connected to the spin valve sensor for conducting a sense current therethrough. The magnetization of the pinned layer is pinned perpendicular to the ABS and the magnetic moment of the free layer is located parallel to the ABS but free to rotate in response to external magnetic fields. The magnetization of the pinned layer is typically pinned by exchange coupling with an antiferromagnetic layer. The thickness of the spacer layer is chosen to be less than the mean free path of conduction electrons through the sensor. With this arrangement, a portion of the conduction electrons is scattered in phase by the interfaces of the spacer layer with the pinned and free layers. When the magnetizations of the pinned and free layers are parallel scattering is at a minimum and when the magnetizations of the pinned and free layers are antiparallel, scattering is at a maximum. Changes in scattering alter the resistance of the spin valve sensor in proportion to $\cos \theta$, where $\theta$ is the angle between the magnetizations of the pinned and free layers. When a sense current is conducted through the spin valve sensor in a direction parallel to surface planes of the layers resistance changes cause potential changes that are detected and processed as playback signals by the processing circuitry.

Another type of sensor is a tunnel junction sensor which receives a tunneling current perpendicular to the surface planes of the layers. The tunneling junction sensor includes a nonmagnetic nonconductive spacer layer between a ferromagnetic pinned layer and a ferromagnetic free layer. The spacer layer, which is an oxide, is thin enough that electron tunneling occurs between the free and pinned layers. The resistance of the sensor is spin dependent which means that the resistance of the sensor changes as a function of the relative orientation of the magnetic moments of the free and pinned layers. The pinned layer is located on and exchanged coupled to an antiferromagnetic pinning layer which pins a magnetic moment of the pinned layer in a first direction which is typically perpendicular to the ABS. The free layer has a magnetic moment which is free to rotate in response to signal fields from the rotating disk. A tunneling current $I_T$ tunnels through the oxide spacer layer as a function of $\sin^2\theta$, where $\theta$ is the angle between the magnetic moments of the pinned and free layers. When the magnetic moments of the free and pinned layers are parallel the resistance to the tunneling current is at a minimum, and when these moments are antiparallel the resistance to the tunneling current is at a maximum. Accordingly, as the tunneling current $I_T$ is conducted through the tunnel junction sensor increases and decreases in the resistance of the sensor causes potential changes that are processed by the aforementioned processing circuitry as playback signals. The processing circuitry employs these potential changes to produce readback signals. The details of tunnel junction are described in a commonly assigned U.S. Pat. No. 5,650,958 to Gallagher et al., which is incorporated by reference herein.

Efforts continue to increase the magnetoresistive coefficient dr/R of spin valve and tunnel junction sensors. One way to increase the magnetoresistive coefficient dr/R is to increase the linear bit density of the sensor. A need exists to provide a tunnel junction sensor that produces asymmetric read back signals.

SUMMARY OF THE INVENTION

I have provided a tunnel junction sensor which produces a dual tunnel junction effect for increasing the magnetoresistive coefficient dr/R of the sensor. This has been accomplished by locating first and second pinned layer structures on each side of a free layer structure wherein the first pinned layer structure is separated from the free layer structure by an oxide first barrier layer and the second pinned layer structure is separated from the free layer structure by an oxide second barrier layer. Accordingly, the tunneling current is modified twice as it tunnels through the first and second barrier layers in response to resistance changes caused by orientations of the first and second pinned layers with respect to the free layer structure. Because of the additive effect of the resistance changes on each side of the free layer the present tunnel junction sensor is referred to herein as a dual tunnel junction sensor. In the several embodiments of the read head the free layer structure is an antiparallel (AP) coupled free layer structure with an AP coupling layer located between first and second AP free layers. Since the first and second AP free layers are strongly antiparallel coupled they rotate together in response to signal fields from a rotating magnetic disk.

The linear bit density of the AP coupled free layer structure is improved over the typical single free layer. In the AP coupled free layer structure one of the AP free layers is thicker than the other AP layer resulting in a net magnetic moment of the free layer structure which is designed to match the magnetization of the signal field from the rotating magnetic disk. This permits the thicknesses of the AP free layers of the AP coupled free layer structure to be optimized for in-phase scattering of the conduction electrons through the sensor. In contrast, a single free layer with a thickness that matches the magnetization of the free layer with the magnetization of high density signal fields from the rotating magnetic disk will be too thin to provide a thickness which optimizes in-phase scattering of conduction electrons through the sensor.

In a tunnel junction sensor the free layer structure is influenced by demagnetization and ferromagnetic coupling fields from the pinned layer structures. The first and second pinned layer structures exert demagnetization fields on the free layer structure which are directed perpendicular to a magnetic moment of the free layer structure in a quiescent condition (tunneling current conducted through the sensor in the absence of signal fields) and the first and second pinned layer structures also exert ferromagnetic coupling fields on the free layer structure which are antiparallel to the aforementioned demagnetization fields. While these fields are in opposite directions it is difficult to completely counterbalance them so that there is no net field rotating the magnetic moment of the free layer structure form its position parallel to the ABS. The present invention provides pinned layer structures which can provide net demagnetization fields for counterbalancing the ferromagnetic coupling fields on the free layer structure. This is accomplished by providing at least one antiparallel pinned layer structure on one side of the free layer structure so that one or more layers of the AP pinned layer structure can be employed for providing, in combination with the other pinned layer structure, the desired net demagnetization field for counterbalancing the ferromagnetic coupling fields.

The present dual tunnel junction sensor has a first antiferromagnetic pinning layer exchange coupled to the first pinned layer structure and has a second antiferromagnetic pinning layer exchange coupled to the second pinned layer structure. I have provided an arrangement of the ferromagnetic layers of the free layer structure and the first and second pinned layer structures so that the magnetic spins of the pinning layers can be set or reset in a single step of applying a magnetic field in the presence of heat at or near the blocking temperatures of the first and second pinned layer structures. In a preferred embodiment the first and second pinning layers employ the same material which preferably has a low blocking temperature, such as below 280° C. I found that when the aforementioned ferromagnetic layers total an odd number the pinning layers can be reset by a single step and the magnetic moments between the free layer structure and each of the first and second pinned layer structures will be in phase so that the tunnel junction effects on each side of the free layer structure are additive as the free layer structure rotates in response to signal fields.

An object of the present invention is to provide a dual tunnel junction sensor wherein, after being reset, the tunnel junction effect is in phase on each side of a free layer structure so as to be additive when the free layer structure is rotated in response to signal fields from a rotating magnetic disk.

Another object is to provide a dual tunnel junction sensor wherein the free layer structure can be optimized, both for matching magnetizations between the free layer structure and signal fields from a rotating magnetic disk and producing maximum spin dependent scattering between the free layer structure and the first and second pinned layer structures.

Other objects and advantages of the invention will become apparent upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
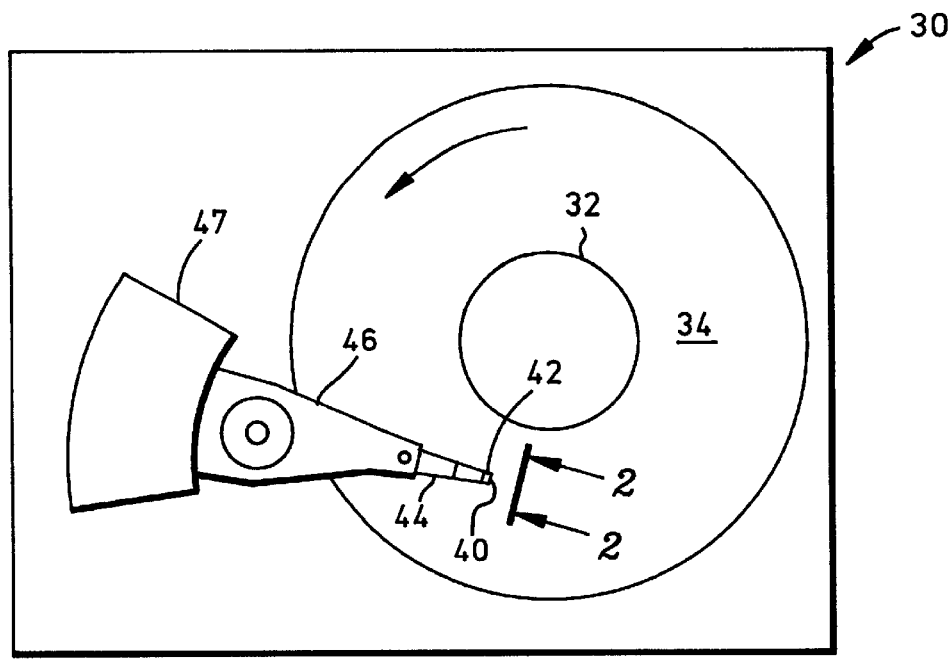
FIG. 1 is a planar view of an exemplary magnetic disk drive.
Figure 2:
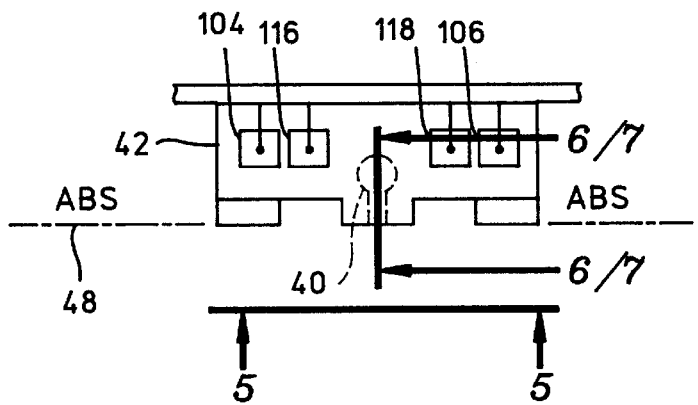
FIG. 2 is an end view of a slider with a magnetic head of the disk drive as seen in plane 2—2.
Figure 3:
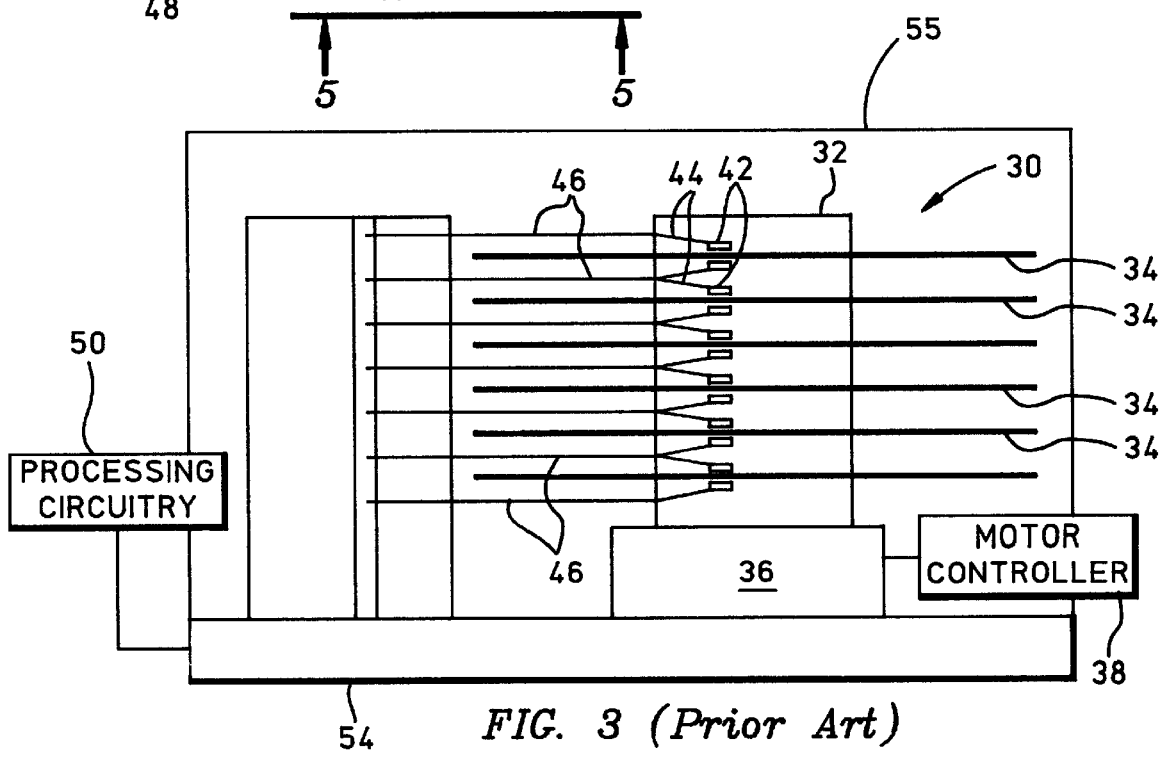
FIG. 3 is an elevation view of the magnetic disk drive wherein multiple disks and magnetic heads are employed.
Figure 4:
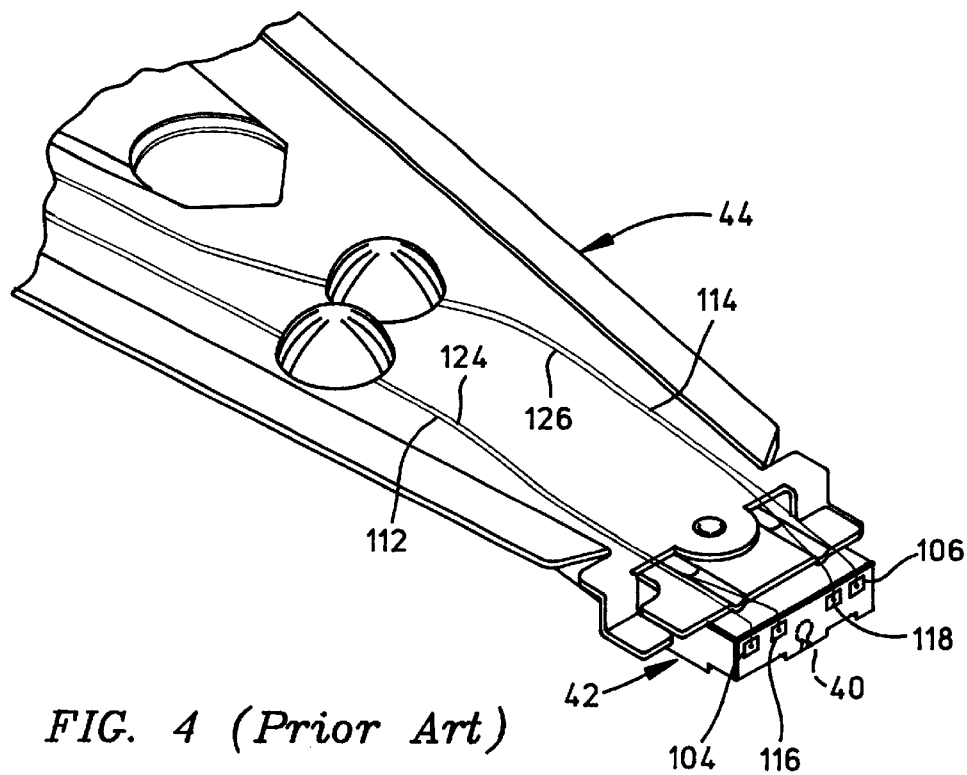
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 supports a combined read and write magnetic head 40 and is supported by a suspension 44 and actuator arm 46 which is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals to the actuator 47, representing such information, with the head 40, provides spindle motor drive signals for rotating the magnetic disk 34, and provides control signals to the actuator 47 for moving the slider to various tracks. In FIG. 4 the slider 42 is shown mounted to a suspension 44. The components described hereinabove may be mounted on a frame 54 of a housing 55, as shown in FIG. 3.

Figure 5:
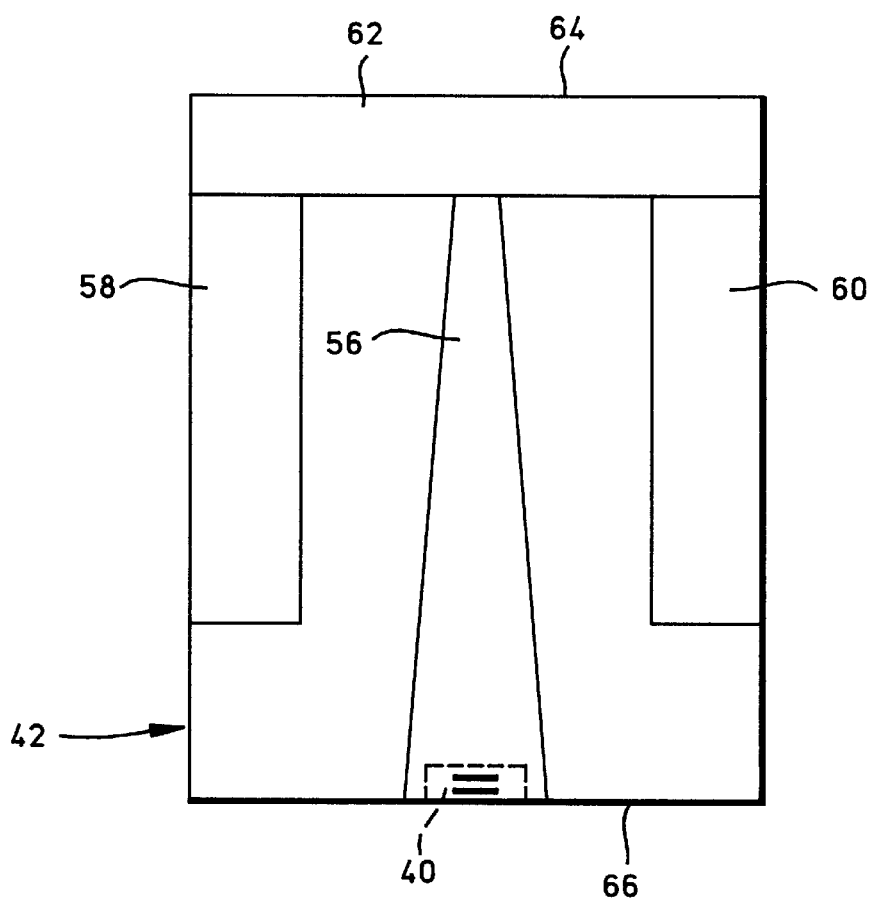
FIG. 5 is an ABS view of the slider taken along plane 5—5 of FIG. 2.

FIG. 5 is an ABS view of the slider 42 and the magnetic head 40. The slider has a center rail 56, which supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
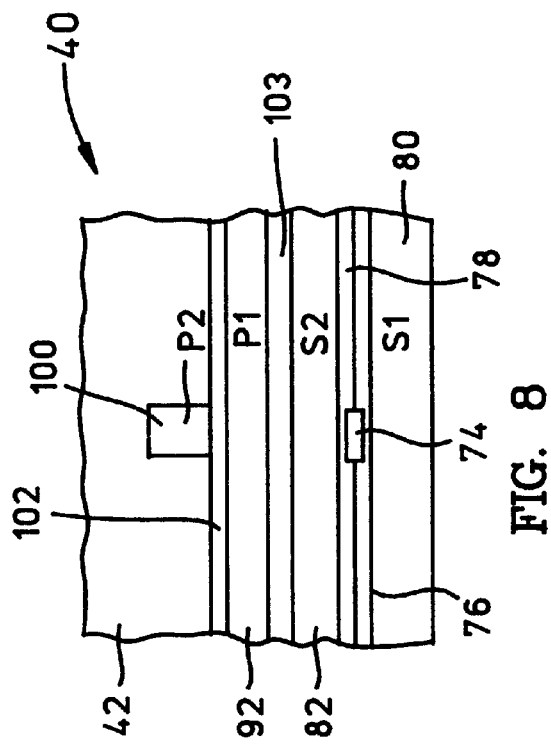
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a tunnel junction sensor 74 of the present invention. FIG. 8 is an ABS view of FIG. 6. The tunnel junction sensor 74 is sandwiched between nonmagnetic nonconductive first and second read gap layers 76 and 78, and the read gap layers are sandwiched between ferromagnetic first and second shield layers 80 and 82. In response to external magnetic fields, the resistance of the tunnel junction sensor 74 changes. A tunneling current $I_T$ conducted through the sensor perpendicular to surface planes of its layers causes these resistance changes to be manifested as potential changes. These potential changes are then processed as readback signals by the processing circuitry 50 shown in FIG. 3. The first and second shield layers 80 and 82 may serve as leads for the sensor 74 for conducting the tunneling current $I_T$ to the sensor and may be connected thereto by conductive vias (not shown) which extend through the first and second read gap layers 76 and 78.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin tunnel junction sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
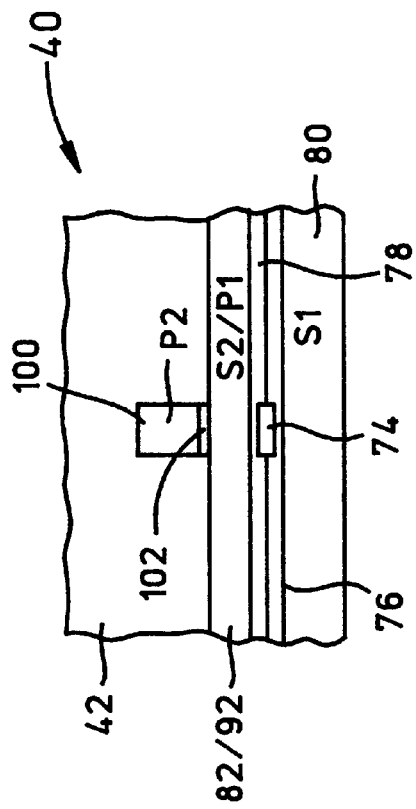
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

The Invention

Figure 11:
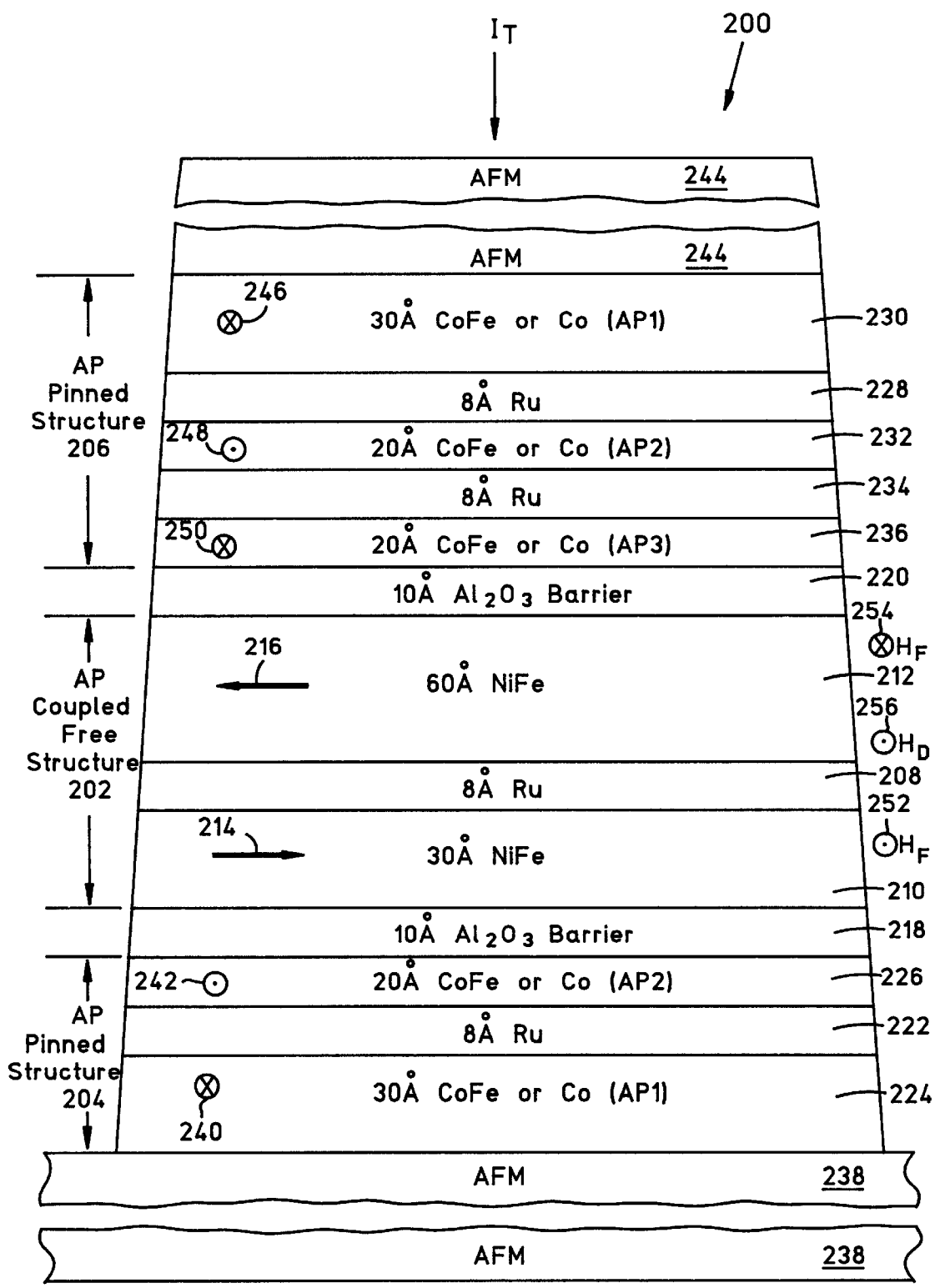
FIG. 11 is an ABS illustration of a first embodiment of the present invention.

A first embodiment of the present tunnel junction sensor 200 is illustrated in FIG. 11 which includes an antiparallel (AP) coupled free layer structure 202 which is located between first and second antiparallel (AP) pinned structures 204 and 206. The free layer structure 202 includes an antiparallel coupling layer 208 which is located between first and second antiparallel (AP) coupled free layers 210 and 212. By strong antiparallel coupling between the first and second AP coupled free layers the magnetic moment 214 of the first AP coupled free layer is oriented antiparallel to the magnetic moment 216 of the second AP coupled free layer. The directions of these magnetic moments may be reversed if desired. One of the AP coupled free layers, such as the second AP coupled free layer 212, is thicker than the first AP coupled free layer 210. The second AP coupled free layer 212 with a thickness of 60 Å of nickel iron (NiFe) is considered sufficient in the art to promote optimized in-phase scattering of the conduction electrons conducted between the AP pinned structure 206 and the AP coupled free layer structure 202. The magnetization of this thickness, however, may be larger than the magnetization of the signal fields from a rotating magnetic disk. With the first AP free layer 210 having a thickness of 30 Å of nickel iron (NiFe), for example the AP coupled free layer structure 202 has a net magnetization that is due to only 30 Å of nickel iron (NiFe) which is the difference between the thicknesses of the first and second AP free layers 210 and 212. This enables the signal fields from the rotating magnetic disk to have less magnetization which, in turn, enables more magnetic bits to be impressed on the magnetic disk thereby increasing the linear bit density and storage capacity of a magnetic disk drive employed by the sensor.

A first tunnel junction oxide barrier layer 218 is located between the first AP pinned layer structure 204 and the AP coupled free layer structure 202 and a second tunnel junction oxide barrier layer 220 is located between the AP pinned structure 206 and the AP coupled free layer structure 202. Each of these layers may be 10 Å of aluminum oxide ($AL_2O_3$). The first AP pinned layer structure 204 includes an AP coupling layer 222 which is located between first and second AP pinned layers (AP1) and (AP2) 224 and 226. The second AP pinned layer structure 206 includes a first AP coupling layer 228 which is located between first and second AP pinned layers (AP1) and (AP2) 230 and 232 and a second AP coupling layer 234, which is located between the second AP pinned layer 232 and a third AP pinned layer (AP3) 236. Accordingly, the AP pinned structure 204 is a double pinned layer structure whereas the AP pinned layer structure 206 is a triple pinned layer structure. Exemplary thicknesses and materials of the AP pinned layer structures 204 and 206 are 30 Å of cobalt iron (CoFe) or cobalt (Co) for the first AP pinned layer 224, 8 Å of ruthenium (Ru) for the AP coupling layer 222, 20 Å of cobalt iron (CoFc) or cobalt (Co) for the second AP pinned layer 226, 30 Å of cobalt iron (CoFe) or cobalt (Co) for the first AP pinned layer 230, 8 Å of ruthenium (Ru) for the first AP coupling layer 228, 20 Å of cobalt iron (CoFe) or cobalt (Co) for the second AP pinned layer 232, 8 Å of ruthenium (Ru) for the second AP coupling layer 234 and 20 Å of cobalt iron (CoFe) or cobalt (Co) for the third AP pinned layer 236. The thicknesses of the ferromagnetic layers of the first and second AP pinned layer structures 204 and 206 will provide a net demagnetization field $H_D$, which will be discussed in more detail hereinafter.

Figure 10:
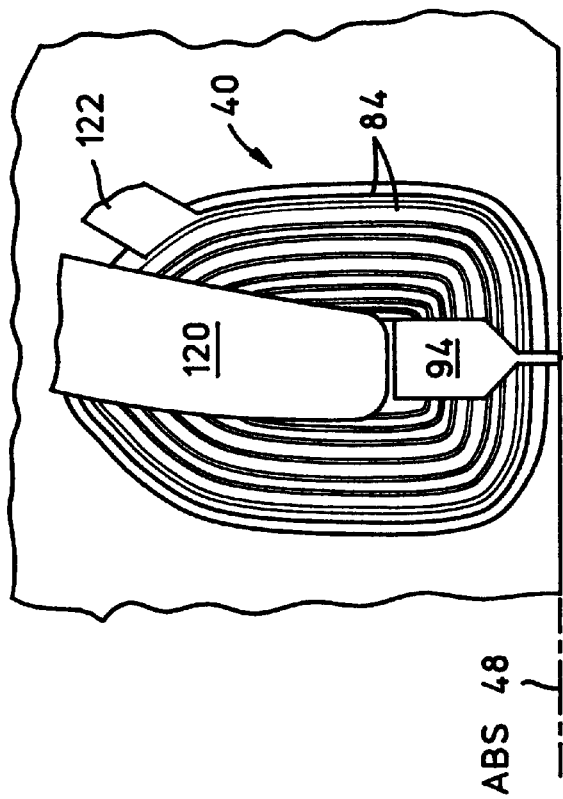
FIG. 10 is a view taken along plane 10—10 of FIGS. 6 or 7 with all material above the coil layer and leads removed.

A first antiferromagnetic (AFM) layer 238 is exchange coupled to the first AP pinned layer 224 for setting its magnetic moment 240 perpendicular to the ABS, either toward the ABS, or away from the ABS as shown in FIG. 3. This causes the magnetic moment 242 of the second AP pinned layer 226 to be antiparallel to the magnetic moment 240. A second antiferromagnetic layer (AFM) 244 is exchange coupled to the first AP pinned layer 230 which causes the magnetic moment 246 of the first AP pinned layer to be pinned perpendicular to the ABS in a direction toward, or away from the ABS as shown in FIG. 10. This causes the magnetic moment 248 of the second AP pinned layer to be antiparallel to the magnetic moment 246 and the magnetic moment 250 of the third AP pinned layer 236 to be antiparallel to the magnetic moment 248.

With this arrangement the second AP pinned layer 226 exerts a ferromagnetic coupling field $H_F$ 252 on the free layer structure 202 which is directed perpendicular to and toward the ABS and the third AP pinned layer 236 exerts a ferromagnetic coupling field $H_F$ 254 on the free layer structure 202 which is directed perpendicular to and away from the ABS. Unfortunately, these ferromagnetic coupling fields 252 and 254 are additive in urging the magnetic moments 214 and 216 of the free layer structure to rotate counterclockwise, as seen from the bottom of the sensor. The combined net demagnetization fields of the first and second AP pinned layer structures 204 and 206, which is illustrated as $H_D$ at 256, may be employed for counterbalancing the ferromagnetic coupling fields 252 and 254. The first AP pinned layer structure 204 has a net demagnetization field of 10 Å of its ferromagnetic material directed perpendicular to and away from the ABS while the second AP pinned layer structure 206 has 30 Å of its ferromagnetic material directed perpendicular to and away from the ABS. The total combined net demagnetization fields of the first and second AP pinned layer structures is 40 Å of ferromagnetic material directed perpendicular to and away from the ABS which is manifested as an equivalent amount of magnetic moment of this thickness of material being manifested as a demagnetization field $H_D$ at 256 directed perpendicular to and toward the ABS. Since the net demagnetization field 256 is spread across the AP coupled free layer structure 202 in contrast to the ferromagnetic coupling fields 252 and 254 acting on the first and second AP coupled free layers 210 and 212 it can be employed for at least partially counterbalancing the effect of the ferromagnetic coupling fields 252 and 254. It should be noted that it is important for one of the AP free layers 210 and 212 to be thicker than the other AP free layer so that one of the AP free layers will be controlling in response to signal fields from the rotating magnetic disk.

In constricting the sensor 200 it is important that the magnetic spins of the first and second pinning layers 238 and 244 be oriented in the same direction so that they can be set or reset with a single step of applying a magnetic field, such as 10,000 Oe, perpendicular to the ABS in the presence of heat, such as 230° C. The amount of heat applied should be near to or exceed the blocking temperature of the material of the pinning layers 238 and 244. The blocking temperature is the temperature at which the magnetic spins of the pinning layers are free to rotate in response to an applied field. In a preferred embodiment the material of the first and second pinning layers 238 and 244 is iridium manganese (IrMn) which has a blocking temperature between 220° C. to 230° C. Other suitable antiferromagnetic materials for the pinning layers with comparatively low blocking temperatures are nickel oxide (NiO) or iron manganese (FeMn). Optionally, the pinning layer 238 may be nickel oxide (NiO) and the second pinning layer 244 may be iridium manganese (IrMn). The first pinning layer 238 pins the magnetic moment 240 perpendicular to and away from the ABS and the second pinning layer 244 pins the magnetic moment 246 perpendicular to and away from the ABS. This is a result of applying the field perpendicular to and away from the ABS in the presence of the aforementioned heat. When this is accomplished it is important that the magnetic moments 242 and 250 of the first and second AP pinned layer strictures be properly oriented so that when the magnetic moment 216 is rotated by a signal field and the magnetic moment 214 follows accordingly the resistances due to the relative orientations of the magnetic moments are additive instead of subtractive.

I have found that when the total number of the ferromagnetic layers of the first and second AP pinned layer structures 204 and 206 and the AP coupled free layer structure 202 total an odd number these magnetic moments are properly phased for adding the resistances due to the relative orientations of the magnetic moments. This can be visualized by assuming a signal field which rotates the magnetic moment 216 upwardly away from the ABS which will cause the magnetic moment 214 to be rotated downwardly toward the ABS. As the magnetic moment 216 is being rotated upwardly it is moving toward a parallel position with the magnetic moment 250 which decreases the resistance and the magnetic moment 214 is being rotated toward a more parallel position with the magnetic moment 242 which decreases the resistance. These decreases in resistances arc additive. If the signal field is in an opposite direction the resistances will increase and the increases in resistances are additive. In the embodiment shown in FIG. 11 there are 7 ferromagnetic layers for achieving this purpose. It should be understood that other odd numbers, such as 5, will achieve the same objective which will be described in more detail hereinafter. By employing antiparallel coupled pinned layer structures 204 and 206 the relative thicknesses of the AP pinned layers can be adjusted so that there is a net demagnetization field for at least partially counterbalancing a net of the ferromagnetic coupling fields 252 and 254.

Figure 12:
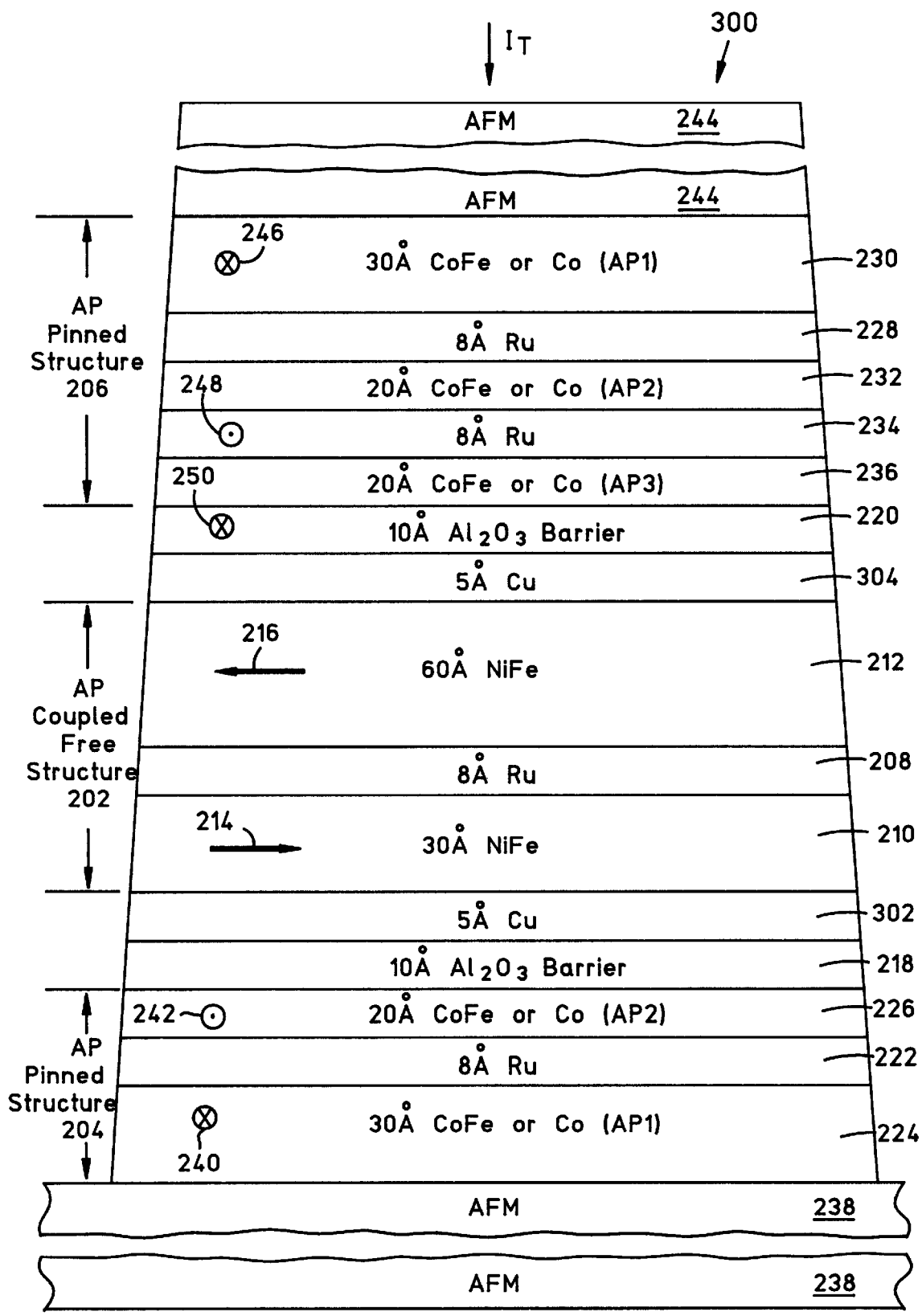
FIG. 12 is an ABS illustration of a second embodiment of the present invention.

Another embodiment of the present tunnel junction sensor 300 is shown in FIG. 12 which is the same as the spin valve sensor 200 shown in FIG. 11, except a first copper (Cu) layer 302 is located between the banier layer 218 and the AP coupled free layer 210 and a second copper (Cu) layer 304 is located between the second barrier layer 220 and the second AP coupled free layer 212. I found that these copper layers reduce the aforementioned ferromagnetic coupling fields 252 and 254 in FIG. 3 so as to improve the biasing of the free layer structure 202 and promote symmetrical readback signals. The copper (Cu) layers 302 and 304 should be very thin and in a preferred embodiment are 5 Å thick.

Figure 13:
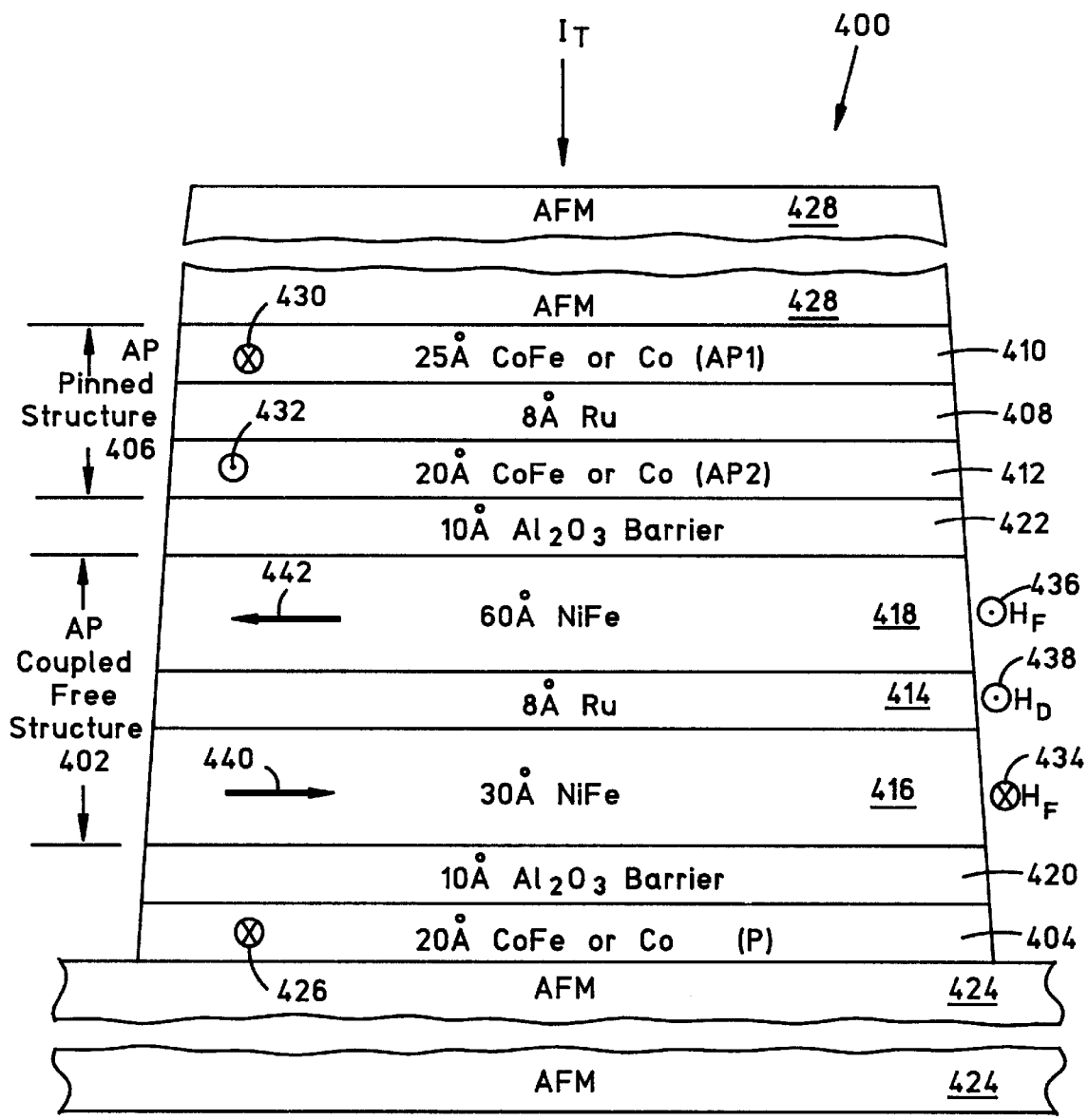
FIG. 13 is an ABS illustration of a third embodiment of the present invention.

A third embodiment of the present spin valve sensor 400 is shown in FIG. 13. This embodiment has five ferromagnetic layers for ensuring in-phase resistance changes which will be discussed in more detail hereinafter. The spin valve sensor 400 includes an AP coupled free layer structure 402 which is located between a single pinned layer (P) 404 and an antiparallel (AP) pinned layer structure 406. The AP pinned layer structure 406 includes an AP coupling layer 408 which is located between first and second AP pinned layers (AP1) and (AP2) 410 and 412. The free layer structure 402 has an AP coupling layer 414 which is located between first and second AP coupled free layers 416 and 418. A first tunnel junction oxide barrier layer 420 is located between the pinned layer 404 and the first AP coupled free layer 416 and a second tunnel junction oxide barrier layer 422 is located between the second AP pinned layer 412 and the second AP coupled free layer 418. A first antiferromagnetic (AFM) pinning layer 424 is exchange coupled to the pinned layer 404 for pinning its magnetic moment 426 perpendicular to and toward the ABS, or away from the ABS as shown in FIG. 13. A second antiferromagnetic (AFM) pinning layer 428 is exchange coupled to the first AP pinned layer 410 for pinning the magnetic moment 430 of the first AP pinned layer perpendicular to and away from the ABS. This causes the magnetic moment 432 of the second AP pinned layer to be oriented antiparallel to the magnetic moment 430.

The magnetic moments 426 and 432 cause ferromagnetic coupling fields $H_F$ 434 and 436, respectively, to be exerted on the first and second AP coupled free layers 416 and 418, respectively. The pinned layer 404 and the pinned layer structure 406 provide a net demagnetization field $H_D$ which is shown at 438, which may be employed for at least partially counterbalancing a net of the ferromagnetic coupling fields 434 and 436. Optionally, the copper (Cu) layers 302 and 304, shown in FIG. 12, may be employed in the spin valve sensor 400 for further reducing the ferromagnetic coupling fields.

The magnetic spins of the first and second pinning layers 424 and 428 may be set by a single step of applying the aforementioned field in the presence of the aforementioned heat. Since there is an odd total number of ferromagnetic layers in the pinned layer 404, the AP pinned layer structure 406 and the AP coupled free layer structure 402 the magnetic moments 426 and 432 are in phase relative to the AP coupled free layer structure 402 for adding the resistance changes due to relative rotations of the magnetic moment 426 relative to the magnetic moment 440 of the first AP coupled free layer 416 and the relative rotations between the magnetic moment 432 of the second AP pinned layer 412 and the magnetic moment 442 of the second AP coupled free layer 418.

Figure 14:
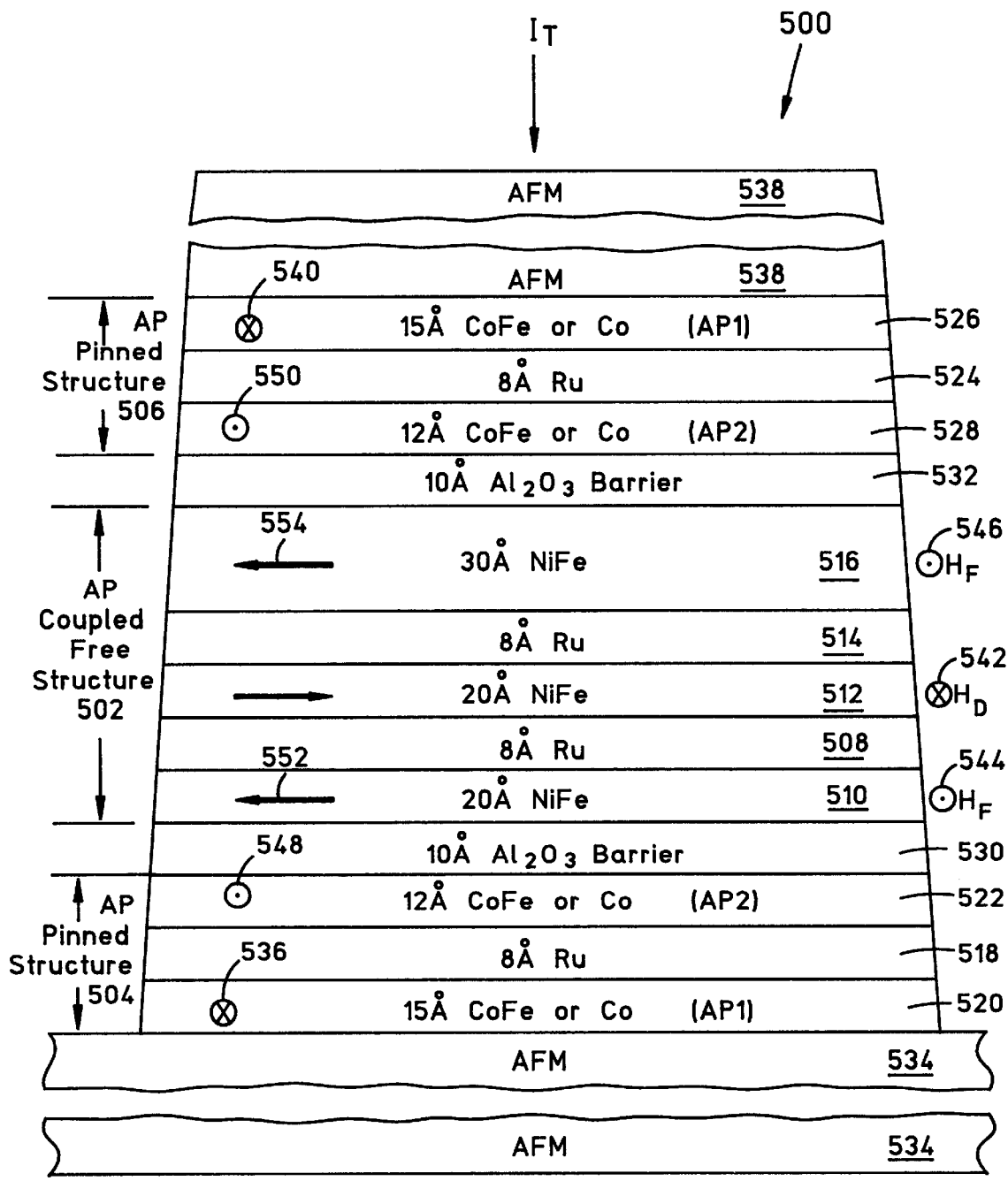
FIG. 14 is an ABS illustration of a fourth embodiment of the present invention.

FIG. 14 illustrates a fourth embodiment of the present spin valve sensor 500 which includes an AP coupled free layer structure 502 located between a first AP pinned layer structure 504 and a second AP pinned layer structure 506. The AP coupled free layer structure 502 includes an AP coupling layer 508 which is located between first and second AP coupled free layers 510 and 512 and a second AP coupled layer 514 which is located between the second AP coupled free layer 512 and a third AP coupled free layer 516. Exemplary thicknesses for the ferromagnetic layers of the AP coupled free layer structure are 20 Å of nickel iron (NiFe) for the first AP free layer 510, 20 Å of nickel iron (NiFe) for the second AP coupled free layer 512 and 30 Å of nickel iron (NiFe) for the third AP coupled free layer 516. Since the total of the thicknesses of the first and third AP coupled free layers 510 and 516 is thicker than the thickness of the second AP coupled free layer 512, these layers are controlling in response to signal fields from a rotating magnetic disk. The first AP pinned layer structure 504 has an AP coupling layer 518 which is located between first and second AP pinned layers (AP1) and (AP2) 520 and 522 and the second AP pinned layer structure 506 has an AP coupling layer 524 between first and second AP pinned layers (AP1) and (AP2) 526 and 528. A first tunnel junction oxide barrier layer 530 is located between the second AP pinned layer 522 and the first AP coupled free layer 510 and a second tunnel junction oxide barrier layer 532 is located between the second AP pinned layer 528 and the third AP coupled free layer 516. A first antiferromagnetic pinning layer 534 is exchange coupled to the first AP pinned layer 520 for setting its magnetic moment 536 and a second antiferromagnetic (AFM) pinning layer 538 is exchange coupled to the first AP pinned layer 526 for setting its magnetic moment 540.

Again, a net demagnetization field $H_D$ shown at 542 may be employed for at least partially counterbalancing a net of the ferromagnetic coupling fields 544 and 546. Since the tunnel junction sensor 500 has seven ferromagnetic layers the magnetic moments 548 and 550 are in phase relative to the magnetic moments 552 and 554 of the free layer structure 502. Also, the magnetic spins of the pinning layers 534 and 538 are set by the aforementioned single step of applying a field in the presence of heat.

Figure 15:
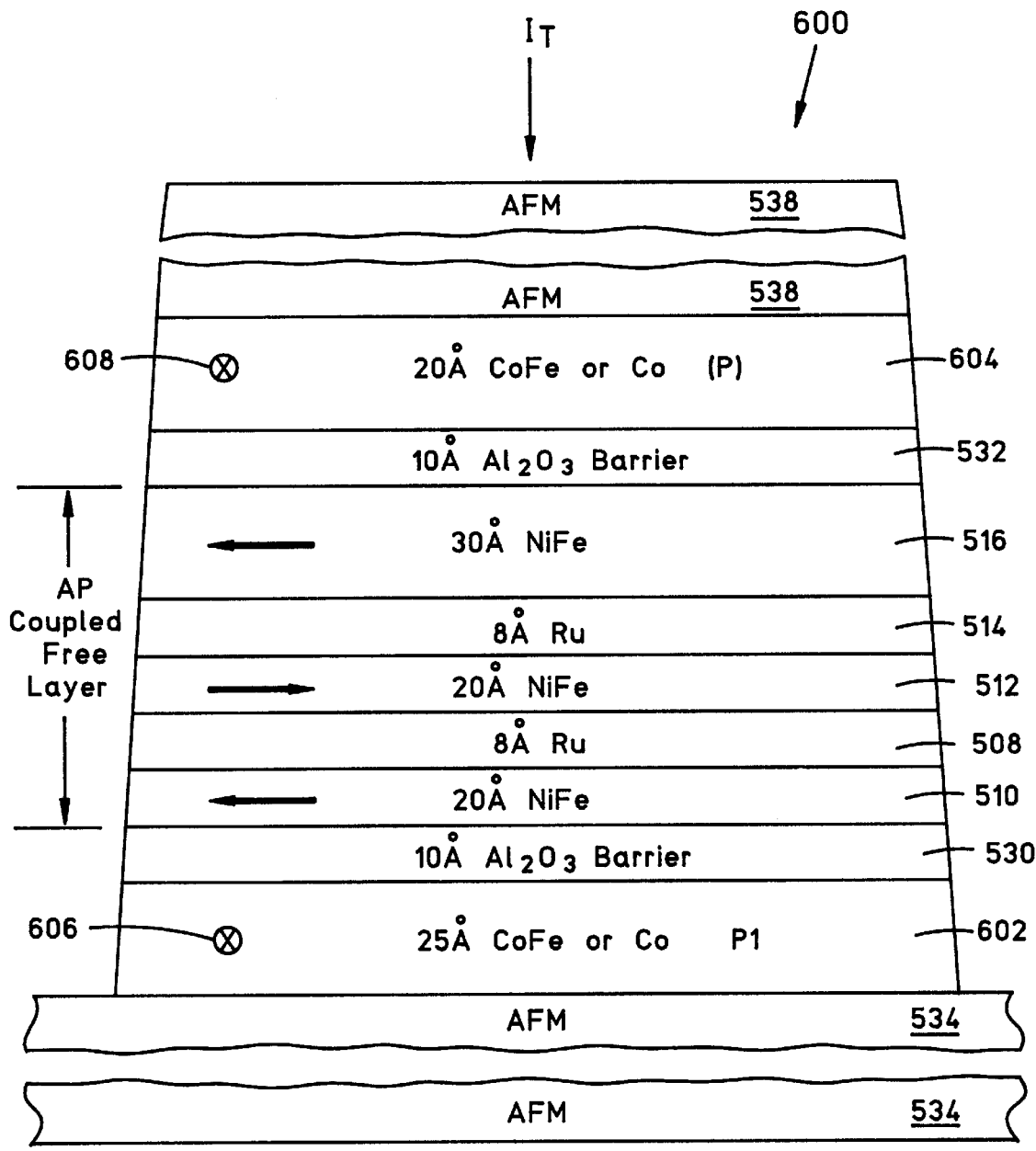
FIG. 15 is an ABS illustration of a fifth embodiment of the present invention.

FIG. 15 illustrates a fifth embodiment of the present tunnel junction sensor 600 which is the same as the tunnel junction sensor 500 in FIG. 13 except a single pinned layer 602 is located between the first pinning layer 534 and the first barrier layer 530 and a second single pinned layer 604 is located between the second pinning layer 538 and the second barrier layer 532. This sensor has five ferromagnetic layers which orients the magnetic moments 606 and 608 relative to the magnetic moments 552 and 554 for an in-phase relationship when the pinning layers 534 and 538 are set by the aforementioned single step.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head having a dual tunnel junction sensor comprising:

an antiparallel (AP) coupled free layer structure having a net magnetic moment that is free to rotate in response to signal fields;

first and second pinned layer structures;

a first tunnel junction barrier layer located between the first pinned layer structure and the AP coupled free layer structure and a second tunnel junction barrier layer located between the second pinned layer structure and the AP coupled free layer structure;

a first antiferromagnetic pinning layer exchange coupled to the first pinned structure for pinning a magnetic moment of the first pinned layer structure and a second antiferromagnetic pinning layer exchange coupled to the second pinned layer structure for pinning a magnetic moment of the second pinned layer structure; and the AP coupled free layer structure and the first and second pinned layer structure having ferromagnetic layers that total to an odd number wherein each of the ferromagnetic layers has no surface which interfaces any surface of any of the other ferromagnetic layers.

2. A magnetic read head as claimed in claim 1 comprising:

nonmagnetic nonconductive first and second read gap layers;

the tunnel junction sensor being located between the first and second read gap layers;

ferromagnetic first and second shield layers; and the first and second read gap layers being located between the first and second shield layers.

3. A magnetic read head as claimed in claim 2 wherein the first and second pinning layer are composed of the same materials.

4. A magnetic read head as claimed in claim 2 including:

a first copper (Cu) layer between the first tunnel junction barrier layer and the free layer structure and a second copper (Cu) layer between the free layer structure and the second tunnel junction barrier layer.

5. A magnetic read head as claimed in claim 2 wherein at least one of the pinned layer structures is an antiparallel (AP) pinned layer structure.

6. A magnetic read head as claimed in claim 2 including:
the AP free layer structure having an AP coupling layer between ferromagnetic first and second AP coupled free layers wherein one of the first and second AP coupled free layers is thicker than the other of the first and second AP coupled free layers.

7. A magnetic read head as claimed in claim 6 including:
the first pinned layer structure being an AP pinned layer structure and having an AP coupling layer between ferromagnetic first and second AP pinned layers; and
the second pinned layer structure being a single ferromagnetic pinned layer.

8. A magnetic read head having a dual tunnel junction sensor comprising:
nonmagnetic nonconductive first and second read gap layers;
a tunnel junction sensor located between the first and second read gap layers;
ferromagnetic first and second shield layers;
the first and second read gap layers being located between the first and second shield layers;
the tunnel junction sensor including:
an antiparallel (AP) coupled free layer structure having a net magnetic moment that is free to rotate in response to signal fields;
the AP free layer structure having an AP coupling layer between ferromagnetic first and second AP coupled free layers wherein one of the first and second AP coupled free layers is thicker than the other of the first and second AP coupled free layers;
first and second pinned layer structures;
the first pinned layer structure having an AP coupling layer between ferromagnetic first and second AP pinned layers;
the second pinned layer structure having ferromagnetic first, second and third AP pinned layers, a first AP coupling layer between the first and second AP pinned layers and a second AP coupling layer between the second and third AP pinned layers;
a first tunnel junction barrier layer located between the first pinned layer structure and the AP coupled free layer structure and a second tunnel junction barrier layer located between the second pinned layer structure and the AP coupled free layer structure;
a first antiferromagnetic pinning layer exchange coupled to the first pinned structure for pinning a magnetic moment of the first pinned layer structure and a second antiferromagnetic pinning layer exchange coupled to the second pinned layer structure for pinning a magnetic moment of the second pinned layer structure; and
the AP coupled free layer structure and the first and second pinned layer structure having ferromagnetic layers that total to an odd number.

9. A magnetic read head as claimed in claim 8 wherein the first and second pinning layer are composed of the same materials.

10. A magnetic read head as claimed in claim 8 including:
a first copper (Cu) layer between the first tunnel junction barrier layer and the free layer structure and a second copper (Cu) layer between the free layer structure and the second tunnel junction barrier layer.

11. A magnetic read head as claimed in claim 10 wherein the first and second pinning layer are composed of the same materials.

12. A magnetic read head having a dual tunnel junction sensor comprising:
nonmagnetic nonconductive first and second read gap layers;
a tunnel junction sensor located between the first and second read gap layers;
ferromagnetic first and second shield layers;
the first and second read gap layers being located between the first and second shield layers;
the tunnel junction sensor including:
an antiparallel (AP) coupled free layer structure having a net magnetic moment that is free to rotate in response to signal fields;
the AP coupled free layer structure having ferromagnetic first, second and third AP coupled free layers with a first AP coupling layer between the first and second AP coupled free layers and a second AP coupling layer between the second and third AP coupled free layers;
first and second pinned layer structures;
a first tunnel junction barrier layer located between the first pinned layer structure and the AP coupled free layer structure and a second tunnel junction barrier layer located between the second pinned layer structure and the AP coupled free layer structure;
a first antiferromagnetic pinning layer exchange coupled to the first pinned structure for pinning a magnetic moment of the first pinned layer structure and a second antiferromagnetic pinning layer exchange coupled to the second pinned layer structure for pinning a magnetic moment of the second pinned layer structure; and
the AP coupled free layer structure and the first and second pinned layer structure having ferromagnetic layers that total to an odd number.

13. A magnetic read head as claimed in claim 12 including:
the first pinned layer structure having ferromagnetic first and second AP pinned layers with an AP coupling layer between the first and second AP pinned layers; and
the second pinned layer structure having ferromagnetic first and second AP pinned layers with an AP coupling layer between the first and second AP pinned layers.

14. A magnetic read head as claimed in claim 12 wherein each of the first and second pinned layer structures is a ferromagnetic single layer.

15. A magnetic head assembly having a read head and a write head comprising:
the write head including:
ferromagnetic first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
a tunnel junction sensor;
nonmagnetic nonconductive first and second read gap layers;
the tunnel junction sensor being located between the first and second read gap layers;

a ferromagnetic first shield layer; and the first and second read gap layers being located between the first shield layer and the first pole piece layer; and the tunnel junction sensor including:

an antiparallel (AP) coupled free layer structure having a net magnetic moment that is free to rotate in response to signal fields;

first and second pinned layer structures;

a first tunnel junction barrier layer located between the first pinned layer structure and the AP coupled free layer structure and a second tunnel junction barrier layer located between the second pinned layer structure and the AP coupled free layer structure;

a first antiferromagnetic pinning layer exchange coupled to the first pinned structure for pinning a magnetic moment of the first pinned layer structure and a second antiferromagnetic pinning layer exchange coupled to the second pinned layer structure for pinning a magnetic moment of the second pinned layer structure; and the AP coupled free layer structure and the first and second pinned layer structure having ferromagnetic layers that total to an odd number wherein each of the ferromagnetic layers has no surface which interfaces any surface of any of the other ferromagnetic layers.

16. A magnetic head assembly as claimed in claim 15 including:

the read head further including:

a ferromagnetic second shield layer;

a nonmagnetic separation layer; and the separation layer being located between the second shield layer and the first pole piece layer.

17. A magnetic head assembly as claimed in claim 15 including:

the AP free layer structure having an AP coupling layer between ferromagnetic first and second AP coupled free layers wherein one of the first and second AP coupled free layers is thicker than the other of the first and second AP coupled free layers.

18. A magnetic head assembly as claimed in claim 17 including:

the first pinned layer structure being an AP pinned layer structure and having an AP coupling layer between ferromagnetic first and second AP pinned layers; and the second pinned layer structure being a single ferromagnetic pinned layer.

19. A magnetic head assembly as claimed in claim 15 including:

the AP free layer structure having ferromagnetic first, second and third AP coupled free layers with a first AP coupling layer between the first and second AP coupled free layers and a second AP coupling layer between the second and third AP coupled free layers.

20. A magnetic head assembly as claimed in claim 19 wherein each of the first and second pinned layer structures is a ferromagnetic single layer.

21. A magnetic head assembly having a read head and a write head comprising:

the write head including:

ferromagnetic first and second pole piece layers;

each of the first and second pole piece layers having a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions; and the read head including:

a tunnel junction sensor;

nonmagnetic nonconductive first and second read gap layers;

the tunnel junction sensor being located between the first and second read gap layers;

a ferromagnetic first shield layer; and the first and second read gap layers being located between the first shield layer and the first pole piece layer; and the tunnel junction sensor including:

an antiparallel (AP) coupled free layer structure having a net magnetic moment that is free to rotate in response to signal fields;

first and second pinned layer structures;

the first pinned layer structure having an AP coupling layer between ferromagnetic first and second AP pinned layers;

the second pinned layer structure having ferromagnetic first, second and third AP pinned layers, a first AP coupling layer between the first and second AP pinned layers and a second AP coupling layer between the second and third AP pinned layers;

a first tunnel junction barrier layer located between the first pinned layer structure and the AP coupled free layer structure and a second tunnel junction barrier layer located between the second pinned layer structure and the AP coupled free layer structure; and a first antiferromagnetic pinning layer exchange coupled to the first pinned structure for pinning a magnetic moment of the first pinned layer structure and a second antiferromagnetic pinning layer exchange coupled to the second pinned layer structure for pinning a magnetic moment of the second pinned layer structure.

22. A magnetic head assembly as claimed in claim 21 wherein the first and second pinning layer are composed of the same materials.

23. A magnetic head assembly as claimed in claim 22 including:

a first copper (Cu) layer between the first tunnel junction barrier layer and the free layer structure and a second copper (Cu) layer between the free layer structure and the second tunnel junction barrier layer.

24. A magnetic head assembly having a read head and a write head comprising:

the write head including:

ferromagnetic first and second pole piece layers;

each of the first and second pole piece layers having a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions; and the read head including:

a tunnel junction sensor;

nonmagnetic nonconductive first and second read gap layers;

the tunnel junction sensor being located between the first and second read gap layers;
a ferromagnetic first shield layer; and
the first and second read gap layers being located between the first shield layer and the first pole piece layer; and
the tunnel junction sensor including:
an antiparallel (AP) coupled free layer structure having a net magnetic moment that is free to rotate in response to signal fields;
the AP coupled free layer structure having ferromagnetic first, second and third AP coupled free layers with a first AP coupling layer between the first and second AP coupled free layers and a second AP coupling layer between the second and third AP coupled free layers;
first and second pinned layer structures;
the first pinned layer structure having ferromagnetic first and second AP pinned layers with an AP coupling layer between the first and second AP pinned layers;
the second pinned layer structure having ferromagnetic first and second AP pinned layers with an AP coupling layer between the first and second AP pinned layers;
a first tunnel junction barrier layer located between the first pinned layer structure and the AP coupled free layer structure and a second tunnel junction barrier layer located between the second pinned layer structure and the AP coupled free layer structure; and
a first antiferromagnetic pinning layer exchange coupled to the first pinned structure for pinning a magnetic moment of the first pinned layer structure and a second antiferromagnetic pinning layer exchange coupled to the second pinned layer structure for pinning a magnetic moment of the second pinned layer structure.

25. A magnetic disk drive having at least one slider that has an air bearing surface (ABS), the slider supporting at least one magnetic head assembly that includes a read head and a write head, the disk drive comprising:
the write head including:
ferromagnetic first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
a tunnel junction sensor;
nonmagnetic nonconductive first and second read gap layers;
the tunnel junction sensor being located between the first and second read gap layers;
a ferromagnetic first shield layer; and
the first and second read gap layers being located between the first shield layer and the first pole piece layer; and
the tunnel junction sensor including:
an antiparallel (AP) coupled free layer structure having a net magnetic moment that is free to rotate in response to signal fields;
first and second pinned layer structures;
a first tunnel junction barrier layer located between the first pinned layer structure and the AP coupled free layer structure and a second tunnel junction barrier layer located between the second pinned layer structure and the AP coupled free layer structure;
a first antiferromagnetic pinning layer exchange coupled to the first pinned structure for pinning a magnetic moment of the first pinned layer structure and a second antiferromagnetic pinning layer exchange coupled to the second pinned layer structure for pinning a magnetic moment of the second pinned layer structure; and
the AP coupled free layer structure and the first and second pinned layer structures having ferromagnetic layers that total to an odd number wherein each of the ferromagnetic layers has no surface which interfaces any surface of any of the other ferromagnetic layers;
housing;
a magnetic disk rotatably supported in the housing;
a support mounted in the housing for supporting the magnetic head assembly with its ABS facing the magnetic disk so that the magnetic head assembly is in a transducing relationship with the magnetic disk;
a spindle motor for rotating the magnetic disk;
an actuator connected to the support for moving the magnetic head assembly to multiple positions with respect to said magnetic disk; and
a processor connected to the magnetic head assembly, to the spindle motor and to the actuator for exchanging signals with the magnetic head assembly, for controlling rotation of the magnetic disk and for controlling the position of the magnetic head assembly relative to the magnetic disk.

26. A magnetic disk drive as claimed in claim 25 including:
the read head further including:
a ferromagnetic second shield layer;
a nonmagnetic separation layer; and
the separation layer being located between the second shield layer and the first pole piece layer.

27. A magnetic disk drive as claimed in claim 25 including:
the AP free layer structure having an AP coupling layer between ferromagnetic first and second AP coupled free layers wherein one of the first and second AP coupled free layers is thicker than the other of the first and second AP coupled free layers.

28. A magnetic disk drive as claimed in claim 27 including:
the first pinned layer structure being an AP pinned layer structure and having an AP coupling layer between ferromagnetic first and second AP pinned layers; and
the second pinned layer structure being a single ferromagnetic pinned layer.

29. A magnetic disk drive having at least one slider that has an air bearing surface (ABS), the slider supporting at least one magnetic head assembly that includes a read head and a write head, the disk drive comprising:
the write head including:
ferromagnetic first and second pole piece layers;
each of the first and second pole piece layers having a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions; and the read head including:

a tunnel junction sensor;

nonmagnetic nonconductive first and second read gap layers;

the tunnel junction sensor being located between the first and second read gap layers;

a ferromagnetic first shield layer; and the first and second read gap layers being located between the first shield layer and the first pole piece layer; and the tunnel junction sensor including:

an antiparallel (AP) coupled free layer structure having a net magnetic moment that is free to rotate in response to signal fields;

the AP coupled free layer structure having an AP coupling layer between ferromagnetic first and second AP coupled free layers wherein one of the first and second AP coupled free layers is thicker than the other of the first and second AP coupled flee layers;

first and second pinned layer structures;

the first pinned layer structure having an AP coupling layer between ferromagnetic first and second AP pinned layers;

the second pinned layer structure having ferromagnetic first, second and third AP pinned layers, a first AP coupling layer between the first and second AP pinned layers and a second AP coupling layer between the second and third AP pinned layers;

a first tunnel junction barrier layer located between the first pinned layer structure and the AP coupled free layer structure and a second tunnel junction barrier layer located between the second pinned layer structure and the AP coupled free layer structure; and a first antiferromagnetic pinning layer exchange coupled to the first pinned structure for pinning a magnetic moment of the first pinned layer structure and a second antiferromagnetic pinning layer exchange coupled to the second pinned layer structure for pinning a magnetic moment of the second pinned layer structure;

a housing;

a magnetic disk rotatably supported in the housing;

a support mounted in the housing for supporting the magnetic head assembly with its ABS facing the magnetic disk so that the magnetic head assembly is in a transducing relationship with the magnetic disk;

a spindle motor for rotating the magnetic disk;

an actuator connected to the support for moving the magnetic head assembly to multiple positions with respect to said magnetic disk; and a processor connected to the magnetic head assembly, to the spindle motor and to the actuator for exchanging signals with the magnetic head assembly, for controlling rotation of the magnetic disk and for controlling the position of the magnetic head assembly relative to the magnetic disk.

30. A magnetic disk drive as claimed in claim 29 wherein the first and second pinning layers are composed of the same materials.

31. A magnetic disk drive as claimed in claim 30 including:

a first copper (Cu) layer between the first tunnel junction barrier layer and the free layer structure and a second copper (Cu) layer between the free layer structure and the second tunnel junction barrier layer.

32. A magnetic disk drive having at least one slider that has an air bearing surface (ABS), the slider supporting at least one magnetic head assembly that includes a read head and a write head, the disk drive comprising:

the write head including:

ferromagnetic first and second pole piece layers;

each of the first and second pole piece layers having a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions; and the read head including:

a tunnel junction sensor;

nonmagnetic nonconductive first and second read gap layers;

the tunnel junction sensor being located between the first and second read gap layers;

a ferromagnetic first shield layer; and the first and second read gap layers being located between the first shield layer and the first pole piece layer; and the tunnel junction sensor including:

an antiparallel (AP) coupled free layer structure having a net magnetic moment that is free to rotate in response to signal fields;

the AP coupled free layer structure having ferromagnetic first, second and third AP coupled free layers with a first AP coupling layer between the first and second AP coupled free layers and a second AP coupling layer between the second and third AP coupled free layers;

first and second pinned layer structures;

a first tunnel junction barrier layer located between the first pinned layer structure and the AP coupled free layer structure and a second tunnel junction barrier layer located between the second pinned layer structure and the AP coupled free layer structure; and a first antiferromagnetic pinning layer exchange coupled to the first pinned structure for pinning a magnetic moment of the first pinned layer structure and a second antiferromagnetic pinning layer exchange coupled to the second pinned layer structure for pinning a magnetic moment of the second pinned layer structure;

a housing;

a magnetic disk rotatably supported in the housing;

a support mounted in the housing for supporting the magnetic head assembly with its ABS facing the magnetic disk so that the magnetic head assembly is in a transducing relationship with the magnetic disk;

a spindle motor for rotating the magnetic disk;

an actuator connected to the support for moving the magnetic head assembly to multiple positions with respect to said magnetic disk; and a processor connected to the magnetic head assembly, to the spindle motor and to the actuator for exchanging signals with the magnetic head assembly, for controlling rotation of the magnetic disk and for controlling the position of the magnetic head assembly relative to the magnetic disk.

33. A magnetic disk drive as claimed in claim 32 including:
the first pinned layer structure having ferromagnetic first and second AP pinned layers with an AP coupling layer between the first and second AP pinned layers; and
the second pinned layer structure having ferromagnetic first and second AP pinned layers with an AP coupling layer between the first and second AP pinned layers.

34. A magnetic disk drive as claimed in claim 32 wherein each of the first and second pinned layer structures is a ferromagnetic single layer.

35. A method of making a read head that includes a tunnel junction sensor comprising the steps of:
a making of the tunnel junction sensor comprising the steps of:
forming an antiparallel (AP) coupled free layer structure having a net magnetic moment that is free to rotate in response to signal fields;
forming first and second pinned layer structures;
forming a first tunnel junction barrier layer between the first pinned layer structure and the AP coupled free layer structure and a second tunnel junction barrier layer between the second pinned layer structure and the AP coupled free layer structure;
forming a first antiferromagnetic pinning layer exchange coupled to the first pinned structure for pinning a magnetic moment of the first pinned layer structure and a second antiferromagnetic pinning layer exchange coupled to the second pinned layer structure for pinning a magnetic moment of the second pinned layer structure; and
forming the AP coupled free layer structure and the first and second pinned layer structures with ferromagnetic layers that total to an odd number wherein each of the ferromagnetic layers has no surface which interfaces any surface of any of the other ferromagnetic layers.

36. A method as claimed in claim 35 further comprising the steps of:
forming nonmagnetic nonconductive first and second read gap layers with the tunnel junction sensor located therebetween; and
forming ferromagnetic first and second shield layers with the first and second read gap layers located therebetween.

37. A method as claimed in claim 36 wherein the first and second pinning layers are formed of the same materials.

38. A method as claimed in claim 36 further including the steps of:
forming a first copper (Cu) layer between the first tunnel junction barrier layer and the free layer structure and a second copper (Cu) layer between the free layer structure and the second tunnel junction barrier layer.

39. A method as claimed in claim 36 wherein at least one of the pinned layer structures is formed as an antiparallel (AP) pinned layer structure.

40. A method as claimed in claim 36 wherein the AP free layer structure is formed with an AP coupling layer between ferromagnetic first and second AP coupled free layers wherein one of the first and second AP coupled free layers is thicker than the other of the first and second AP coupled free layers.

41. A method as claimed in claim 40 further comprising the steps of:
forming the AP free layer structure with ferromagnetic first, second and third AP coupled free layers with a first AP coupling layer between the first and second AP coupled free layers and a second AP coupling layer between the second and third AP coupled free layers.

42. A method as claimed in claim further comprising the steps of:
forming the first pinned layer structure with an AP coupling layer between ferromagnetic first and second AP pinned layers; and
forming the second pinned layer structure with an AP coupling layer between ferromagnetic first and second AP pinned layers.

43. A method as claimed in claim 44 wherein each of the first and second pinned layer structures is formed with a ferromagnetic single layer.

44. A method of making a read head that includes a tunnel junction sensor comprising the steps of:
forming nonmagnetic nonconductive first and second read gap layers with the tunnel junction sensor located therebetween;
forming ferromagnetic first and second shield layers with the first and second read gap layers located therebetween;
a making of the tunnel junction sensor comprising the steps of:
forming an antiparallel (AP) coupled free layer structure having a net magnetic moment that is free to rotate in response to signal fields;
the AP coupled free layer structure being formed with an AP coupling layer between ferromagnetic first and second AP coupled free layers wherein one of the first and second AP coupled free layers is thicker than the other of the first and second AP coupled free layers;
forming first and second pinned layer structures;
forming the first pinned layer structure with an AP coupling layer between ferromagnetic first and second AP pinned layers;
forming the second pinned layer structure with ferromagnetic first, second and third AP pinned layers, a first AP coupling layer between the first and second AP pinned layers and a second AP coupling layer between the second and third AP pinned layers;
forming a first tunnel junction barrier layer between the first pinned layer structure and the AP coupled free layer structure and a second tunnel junction barrier layer between the second pinned layer structure and the AP coupled free layer structure;
forming a first antiferromagnetic pinning layer exchange coupled to the first pinned structure for pinning a magnetic moment of the first pinned layer structure and a second antiferromagnetic pinning layer exchange coupled to the second pinned layer structure for pinning a magnetic moment of the second pinned layer structure; and
forming the AP coupled free layer structure and the first and second pinned layer structures with ferromagnetic layers that total to an odd number.

45. A method as claimed in claim 44 wherein the first and second pinning layers are formed of the same materials.

46. A method as claimed in claim 44 further including the steps of:
forming a first copper (Cu) layer between the first tunnel junction barrier layer and the free layer structure and a second copper (Cu) layer between the free layer structure and the second tunnel junction barrier layer.

47. A method as claimed in claim 46 wherein the first and second pinning layers are formed of the same materials.

48. A method of making a magnetic head assembly having a read head and a write head comprising the steps of:
a forming of the write head comprising the steps of:
forming ferromagnetic first and second pole piece layers with a yoke portion between a pole tip portion and a back gap portion;
forming a nonmagnetic write gap layer between the pole tip portions of the first and second pole piece layers;
forming an insulation stack with at least one coil layer embedded therein in the yoke portions of the first and second pole piece layers; and
connecting the first and second pole piece layers at their back gaps portions; and
a forming of the read head comprising the steps of:
forming nonmagnetic nonconductive first and second read gap layers;
forming a tunnel junction sensor between the first and second read gap layers;
forming a ferromagnetic first shield layer; and
forming the first and second read gap layers between the first shield layer and the first pole piece layer; and
a making of the tunnel junction sensor comprising the steps of:
forming an antiparallel (AP) coupled free layer structure having a net magnetic moment that is free to rotate in response to signal fields;
forming first and second pinned layer structures;
forming a first tunnel junction barrier layer between the first pinned layer structure and the AP coupled free layer structure and a second tunnel junction barrier layer between the second pinned layer structure and the AP coupled free layer structure;
forming a first antiferromagnetic pinning layer exchange coupled to the first pinned structure for pinning a magnetic moment of the first pinned layer structure and a second antiferromagnetic pinning layer exchange coupled to the second pinned layer structure for pinning a magnetic moment of the second pinned layer structure; and
forming the AP coupled free layer structure and the first and second pinned layer structures with ferromagnetic layers that total to an odd number wherein each of the ferromagnetic layers has no surface which interfaces any surface of any of the other ferromagnetic layers.

49. A method as claimed in claim 48 further comprising the steps of:
forming a ferromagnetic second shield layer between the second read gap layer and the first pole piece layer; and
forming a nonmagnetic separation layer between the second shield layer the first pole piece layer.

50. A method as claimed in claim 48 wherein the AP free layer structure is formed with an AP coupling layer between ferromagnetic first and second AP coupled free layers wherein one of the first and second AP coupled free layers is thicker than the other of the first and second AP coupled free layers.

51. A method as claimed in claim 50 further comprising the steps of:
forming the AP free layer structure with ferromagnetic first, second and third AP coupled free layers with a first AP coupling layer between the first and second AP coupled free layers and a second AP coupling layer between the second and third AP coupled free layers.

52. A method as claimed in claim 51 further comprising the steps of:
forming the first pinned layer structure with an AP coupling layer between ferromagnetic first and second AP pinned layers; and
forming the second pinned layer structure with an AP coupling layer between ferromagnetic first and second AP pinned layers.

53. A method as claimed in claim 51 wherein each of the first and second pinned layer structures is formed with a ferromagnetic single layer.

54. A method of making a magnetic head assembly having a read head and a write head comprising the steps of:
a forming of the write head comprising the steps of:
forming ferromagnetic first and second pole piece layers with a yoke portion between a pole tip portion and a back gap portion;
forming a nonmagnetic write gap layer between the pole tip portions of the first and second pole piece layers;
forming an insulation stack with at least one coil layer embedded therein in the yoke portions of the first and second pole piece layers; and
connecting the first and second pole piece layers at their back gaps portions; and
a forming of the read head comprising the steps of:
forming nonmagnetic nonconductive first and second read gap layers;
forming a tunnel junction sensor between the first and second read gap layers;
forming a ferromagnetic first shield layer; and
forming the first and second read gap layers between the first shield layer and the first pole piece layer; and
a making of the tunnel junction sensor comprising the steps of:
forming an antiparallel (AP) coupled free layer structure having a net magnetic moment that is free to rotate in response to signal fields;
forming first and second pinned layer structures;
forming the first pinned layer structure with an AP coupling layer between ferromagnetic first and second AP pinned layers;
forming the second pinned layer structure with ferromagnetic first, second and third AP pinned layers, a first AP coupling layer between the first and second AP pinned layers and a second AP coupling layer between the second and third AP pinned layers;
forming a first tunnel junction barrier layer between the first pinned layer structure and the AP coupled free layer structure and a second tunnel junction barrier layer between the second pinned layer structure and the AP coupled free layer structure; and
forming a first antiferromagnetic pinning layer exchange coupled to the first pinned structure for pinning a magnetic moment of the first pinned layer structure and a second antiferromagnetic pinning layer exchange coupled to the second pinned layer structure for pinning a magnetic moment of the second pinned layer structure.

55. A method as claimed in claim 54 wherein the first and second pinning layers are formed of the same materials.

56. A method as claimed in claim 54 further including the steps of:

forming a first copper (Cu) layer between the first tunnel junction barrier layer and the free layer structure and a second copper (Cu) layer between the free layer structure and the second tunnel junction barrier layer.

57. A method as claimed in claim 56 wherein the first and second pinning layers are formed of the same materials.

* * * * *